(12) United States Patent
Nandan et al.

(10) Patent No.: US 11,789,836 B2
(45) Date of Patent: *Oct. 17, 2023

(54) DEBUG FOR MULTI-THREADED PROCESSING

(71) Applicant: Texas Instruments Incorporated, Dallas, TX (US)

(72) Inventors: Niraj Nandan, Plano, TX (US); Hetul Sanghvi, Murphy, TX (US); Mihir Mody, Bangalore (IN); Gary Cooper, Oakmont, PA (US); Anthony Lell, San Antonio, TX (US)

(73) Assignee: Texas Instruments Incorporated, Dallas, TX (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/462,046

(22) Filed: Aug. 31, 2021

(65) Prior Publication Data

US 2021/0397528 A1    Dec. 23, 2021

Related U.S. Application Data

(63) Continuation of application No. 16/236,745, filed on Dec. 31, 2018, now Pat. No. 11,144,417.

(51) Int. Cl.
| | |
|---|---|
| *G06F 11/00* | (2006.01) |
| *G06F 11/273* | (2006.01) |
| *G06F 11/22* | (2006.01) |
| *G06F 9/48* | (2006.01) |
| *G06F 13/28* | (2006.01) |
| *G06F 13/16* | (2006.01) |

(52) U.S. Cl.
CPC ........ *G06F 11/2733* (2013.01); *G06F 9/4843* (2013.01); *G06F 11/2242* (2013.01); *G06F 13/1668* (2013.01); *G06F 13/28* (2013.01)

(58) Field of Classification Search
CPC .............. G06F 11/2733; G06F 9/4843; G06F 11/2242; G06F 13/1668; G06F 11/2236
See application file for complete search history.

(56) References Cited

U.S. PATENT DOCUMENTS 9,785,538 B2 * 10/2017 Brites ................. G06F 11/3648
2003/0163675 A1 * 8/2003 Bennett ................. G06F 9/3851
712/E9.046

(Continued)

*Primary Examiner* — Amine Riad
(74) *Attorney, Agent, or Firm* — Brian D. Graham; Frank D. Cimino (57) ABSTRACT

A system to implement debugging for a multi-threaded processor is provided. The system includes a hardware thread scheduler configured to schedule processing of data, and a plurality of schedulers, each configured to schedule a given pipeline for processing instructions. The system further includes a debug control configured to control at least one of the plurality of schedulers to halt, step, or resume the given pipeline of the at least one of the plurality of schedulers for the data to enable debugging thereof. The system further includes a plurality of hardware accelerators configured to implement a series of tasks in accordance with a schedule provided by a respective scheduler in accordance with a command from the debug control. Each of the plurality of hardware accelerators is coupled to at least one of the plurality of schedulers to execute the instructions for the given pipeline and to a shared memory.

20 Claims, 5 Drawing Sheets

(56) References Cited

U.S. PATENT DOCUMENTS

| | | | | |
|---|---|---|---|---|
| 2004/0205720 A1* | 10/2004 | Hundt | ................ | G06F 11/3644 |
| | | | | 717/124 |
| 2008/0126865 A1* | 5/2008 | Lee | .................... | G06F 11/3652 |
| | | | | 714/E11.002 |
| 2013/0339681 A1* | 12/2013 | Prado | ................ | G06F 9/30123 |
| | | | | 712/225 |
| 2019/0258251 A1* | 8/2019 | Ditty | .................... | G06V 20/58 |

* cited by examiner

DEBUG FOR MULTI-THREADED PROCESSING

CROSS-REFERENCE TO RELATED APPLICATIONS

This application is a continuation of U.S. patent application Ser. No. 16/236,745, filed on Dec. 31, 2018, the entirety of which is incorporated by reference.

TECHNICAL FIELD

This disclosure relates to debugging systems and methods for multi-threaded processing.

BACKGROUND

As software and electronic systems have become more complex, various common debugging techniques have developed with more methods to detect anomalies, assess impact, and apply updates to a system. Considering the collateral issues, such as the cost-versus-benefit impact assessment, debugging techniques may expand to determine the frequency of anomalies as well as to help assess their impact to the overall system. Debugging solutions for multi-threaded processing systems are often limited or absent due to the underlying difficulty with extending to multi-threaded subsystems due to interactions between threads and shared resources.

SUMMARY

This disclosure relates to a system and method to implement debugging for multi-threaded processing.

In one example, a system to implement debugging for a multi-threaded processor is provided. The system includes a hardware thread scheduler configured to schedule processing of data, and a plurality of schedulers, each configured to schedule a given pipeline for processing instructions. The system further includes a debug control configured to control at least one of the plurality of schedulers to halt, step, or resume the given pipeline of the at least one of the plurality of schedulers for the data to enable debugging thereof. The system further includes a plurality of hardware accelerators configured to implement a series of tasks in accordance with a schedule provided by a respective scheduler in accordance with a command from the debug control. Each of the plurality of hardware accelerators is coupled to at least one of the plurality of schedulers to execute the instructions for the given pipeline and to a shared memory.

In another example, a method to implement debugging of a multi-threaded processor is provided. The method includes receiving a debug command via an interface, broadcasting a debug request, by a debug control, to a plurality of schedulers within a hardware thread scheduler based on the debug command, the plurality of schedulers configured to schedule processing of tasks by a plurality of pipelines that include respective hardware accelerators, sending a first acknowledgement, by the plurality of schedulers, to indicated that the debug command has been received, processing the debug request by the plurality of schedulers to advance at least one active pipeline to a next stable state, and sending a second acknowledgement to indicate that the debug command has been processed, by the plurality of schedulers.

DETAILED DESCRIPTION

The disclosed examples provide a debug control (which may be configured as a unit of hardware) embedded within a hardware thread scheduler for multi-threaded processing. In some examples the multi-threaded processing is configured to implement image, vision, and video processing using multiple hardware processing accelerators. The debug control is configured to control a processing thread, such as to halt, step, and/or resume respective threads. Enabling the functions of halt, step, and resume allows real-time pipeline debugging of a multithreaded system, including systems that have a real time processing accelerator. For example, a breakpoint is one type of halt command to implement debug control. In response to encountering a breakpoint or other halt command, the debug control can instruct one or more schedulers (e.g., pipeline schedulers) to halt execution of tasks associated with one or more active pipelines to allow investigation and other debug operations. For example, the debug control can broadcast the halt instruction. In response to the halt instruction, logic can determine (e.g., based on configuration data stored in memory) which pipelines are active and are enabled to execute the halt instructions. Each active pipeline that is enabled can then implement the halt instruction by stopping the current task at a nearest task boundary. While halted, the investigation and/or other debug operations may include, for example, analyzing register values, stack data, memory locations or source code for the halted pipeline. A task is a certain function that executes on a processing block or hardware accelerator. A hardware accelerator can also be referred to as a node. A pipeline is a series of threads (or a subset of full threads) working together to achieve one functionality. Multiple pipelines work independently of each other without any data buffer sharing.

The debug control is configured to control a plurality of schedulers (e.g., hardware schedulers) that are coupled to a cross bar that is also embedded within the hardware thread scheduler. For example, the debug control can instruct a task scheduler (or a group of two or more such schedulers) to halt a current task, step to a next task when halted or resume (e.g., end the halt). The schedulers are in turn coupled to a plurality of hardware accelerators that are responsible for executing active tasks within respective pipelines, where a task is a unit of operation (e.g., compute data, load data, store data). The hardware accelerators are coupled to a shared memory. Additionally, the debug control broadcasts debug commands to a plurality of producer and consumer schedulers, which are coupled to a memory structure, such as direct memory access (DMA) structure. The tasks executed by the hardware accelerators are responsive to commands provided by a respective scheduler, which, as noted, are responsive to command instructions from the debug control for debug operations. The disclosed examples are relevant to and can be implemented in a multi-threaded processing system. As one example, the debug controls described herein may be used in the areas of Advanced Driver Assistance Systems (ADAS), automotive control and safety applications, image and vision processing, infotainment, high performance computing, robotics, surveillance, and drones to name a few.

Figure 1:
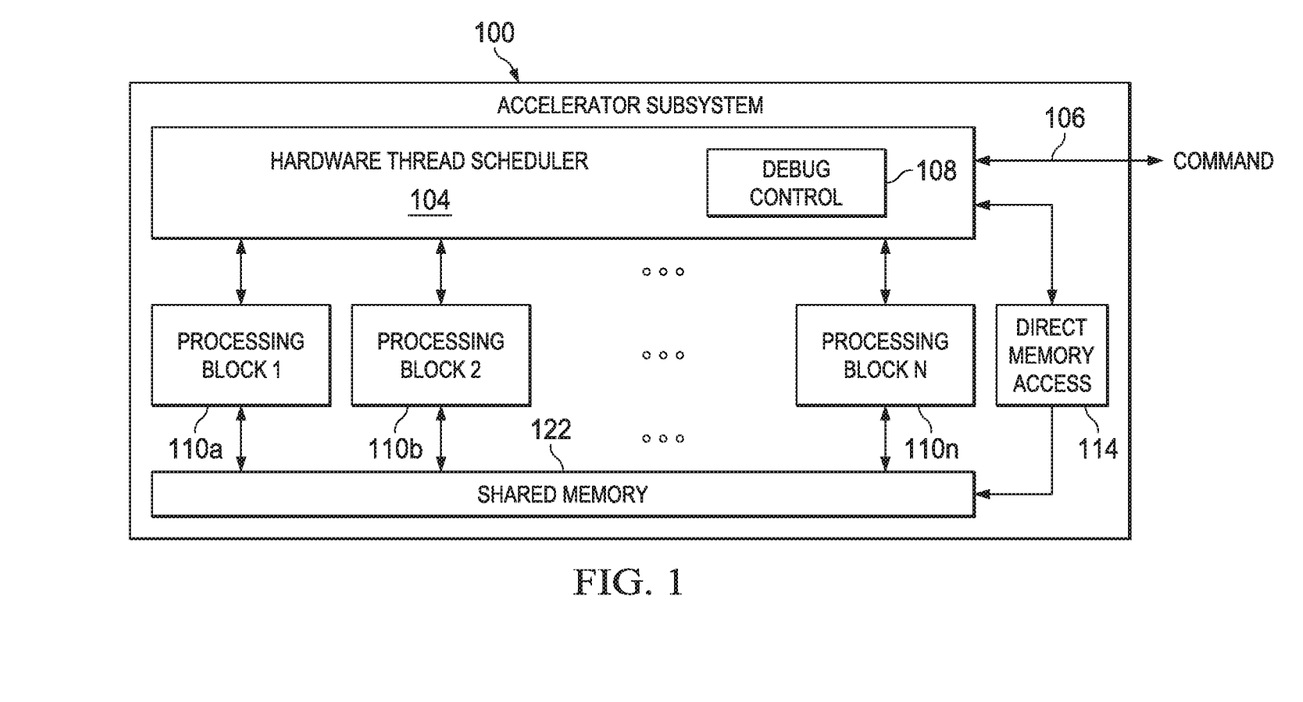
FIG. 1 is a block diagram depicting an example debugging system that includes a debug control implemented within an accelerator subsystem.

FIG. 1 is a block diagram of an example accelerator subsystem 100 that is configured to perform debugging of resources. The accelerator subsystem 100 may be implemented as part of a system on a chip (SoC) or as discrete components. The accelerator subsystem 100 includes a hardware thread scheduler (HTS) 104 and a debug control 108 embedded within the HTS 104. The accelerator subsystem 100 also includes a command interface 106 configured to provide instructions to HTS 104. The system 100 further includes a plurality of processing blocks 1, 2 . . . N (110a, 110b, and 110n), each being coupled to a shared memory 122. Each processing block (110a-n) is configured for executing a number of tasks, which may vary according to application specifications. For example, the processing blocks are configured to read and write data into shared memory 122. The processing blocks 1 . . . N (110a-n) execute various tasks based on a schedule set forth and controlled by the HTS 104. In some examples, a given pipeline may be subjected to a sequence of debug actions in response to a debug command received via command interface 106.

For example, the processing blocks 110a-n are functional hardware accelerators configured to perform independent processing functions on one or more lines or blocks of input data. As a further example, in an Advanced Driver Assistance System (ADAS), the processing blocks 110 may be configured as an image processing system, a lens distortion correction engine, a noise filter, a multiscalar engine, a stereo disparity engine, a dense optical flow engine, and/or a DMA engine. Other processing blocks may be implemented in other application contexts. The processing blocks 110a, 110b, 110n may process data either on a block basis or a line basis. Also, the processing blocks asynchronously and concurrently access shared memory 122. The systems and methods disclosed herein enable selectively halting/stepping/resuming one or more processing blocks in active, debug-enabled pipelines in response to a debug command while allowing one or more other blocks to continue processing (e.g., by configuring such block(s) to ignore the debug command). For example, one or more pipelines can be configured to exclude (e.g., disable) debug operations, i.e. to ignore halt/step/resume commands, such as by setting one or more register values in a memory mapped register to specify whether debug operations are enabled or disabled for each pipeline.

The HTS 104 schedules one or more tasks when the HTS 104 initiates a particular function, or a unit of operation. For example, loading a line or block of data is considered a task. An aggregation of several tasks together within a time window constitutes a thread. For example, a series of load tasks, store tasks, and data compute tasks creates a thread. Such a series of tasks, or a thread, are executed from start to completion. Thus, a thread represents a sequence of tasks which have consumer/producer dependencies. A pipeline represents a set of physical resources that cooperate to execute a given thread, including the HTS 104, processing blocks 1 . . . N, DMA 114 and shared memory 122.

By way of example, the processing block 110 in a given pipeline may be a video imaging subsystem (VISS), which is a line based image processing component with multiple modes of operation. In one mode, the VISS can either directly take the data (e.g., from an external port where a camera is connected to a wire component), process the data and write the data to the shared memory 122. In a second mode, the DMA attached to the VISS can read data into shared memory 122 that has been written to a buffer, and then the VISS can load the data from the shared memory 122, process the data, and write the data to shared memory 122. For example, during investigation of a failure to part of the VISS, the debug control 108 can control the actions of a pipeline in response to command from command interface 106, which can be a halt, step, or resume command. If the command is a halt command, for example, a thread within the VISS processing block can be stopped in order to investigate an issue. While, the block is stopped during or after the issue is investigated, another command at command interface 106 (e.g., step command) may be issued to control the VISS processing block to execute one task and then return to its halt state. Then, after further investigation another command at command interface 106 (e.g., resume command) may be issued to resume execution (e.g., normal operation). A resume command at command interface 106 while in a halted state ends a debug session and resumes execution and functional processing of the processing thread. For example, if a debugging session is complete, the debug control can issue a command to end the halt state, which enables VISS data processing engine and connected components of a pipeline to transition the out of the halted state, resume normal operation and end the debug session.

Each of the halt, step, and resume commands can be received via a hardware interface or a software interface, collectively demonstrated at 106. In one example, the command can be initiated from an external interface driven by one or more components of SoC. In another example, the command can be initiated via a software write by a memory mapped register into a predefined control register. The command can be one of a software halt command, a hardware halt command, a resume command, or a step command. The halt command causes the HTS 104 to selectively transition one or more pipelines (and associated hardware, e.g., schedulers, hardware accelerators, etc.) to a halted condition so that each such pipeline operates in a debug state and investigation of one or more pipelines and/or threads may be implemented. The step command causes the system to selectively transition one or more halted pipelines transition out of a debug state, temporarily, such that one task is executed within the selected pipelines. The resume command causes the system to transition each halted pipeline out of the debug state to enable normal execution of scheduled tasks to be performed.

The HTS 104 is configured to schedule execution of the tasks for the processing blocks 110a, 110b, 110n. The accelerator subsystem 100 includes shared memory 122 that is used by different processing blocks 1, 2 . . . N (110a, 110b, and 110n) for executing tasks scheduled by the HTS. For example, each processing block 110a, 110b, and 110n is configured to access the shared memory 122 to process a line of data, multiple lines of data, or one or more blocks of data. In some examples, the processing blocks 1, 2, . . . N can be combined with one another, or the processing blocks 1, 2, . . . N can process real-time streaming data from another input source (e.g., not from shared memory 122), such as from an external sensor (e.g. a camera sensor). Also, several different processing blocks 110a, 110b, . . . 110n may be configured for processing data concurrently. The HTS 104 may be independent from a host processor (not shown). The HTS 104 may also provide a messaging layer for low-overhead synchronization of parallel computing tasks and DMA transfers.

As a further example, in operation, direct memory access (DMA) 114 loads data into shared memory 122 and informs HTS 104 that data has been loaded into shared memory 122. The HTS 104 in turn sends an acknowledgement to DMA 114 that data has been processed. The HTS 104 then informs the relevant processing block 1 . . . N that data has been loaded into shared memory 122 for processing according to scheduled tasks. The HTS 104 also checks for availability of input data and of adequate space within shared memory 122 or other resources so that a relevant processing block 110*a-n* can execute a scheduled task via the one or more processing block 110*a*, 110*b*, . . . 110*n*. The relevant processing block 110*a-n* accesses the shared memory and computes an output and writes the output back into shared memory 122. The processing block 110*a-n* then informs the HTS 104 that the data has been written into shared memory 122. This operation continues over a series of tasks until a predefined amount of data is processed by the particular processing block (110*a*, 110*b*, or 110*n*) from a first unit of data to a last unit of data, and written to an ultimate destination. For example, the ultimate destination can be a double data rate synchronous dynamic random-access memory (DDR SDRAM) or other memory that is external to the accelerator subsystem 100. The HTS 104 supports the execution of several independent threads, such that each thread can start and end independently.

The debug control 108 thus provides a number of functional debug features to the accelerator subsystem 100. For example, the debug control 108 provides the ability to debug multiple selected asynchronous pipelines/threads in parallel. The debug control 108 and accelerator subsystem 100 further may be configured to control task schedulers to halt processing of one or more lines of data and/or multiple blocks of data in respective ones of a number of hardware accelerators (e.g., processing blocks 110). Additionally or alternatively, the debug control 108 and the accelerator subsystem 100 configured for halting a selected hardware accelerator. In this example, debug control works in close coordination with a debugger host external to the accelerator subsystem 100, such as running on a system on a chip (SoC) or on modules external to the SoC.

Figure 2:
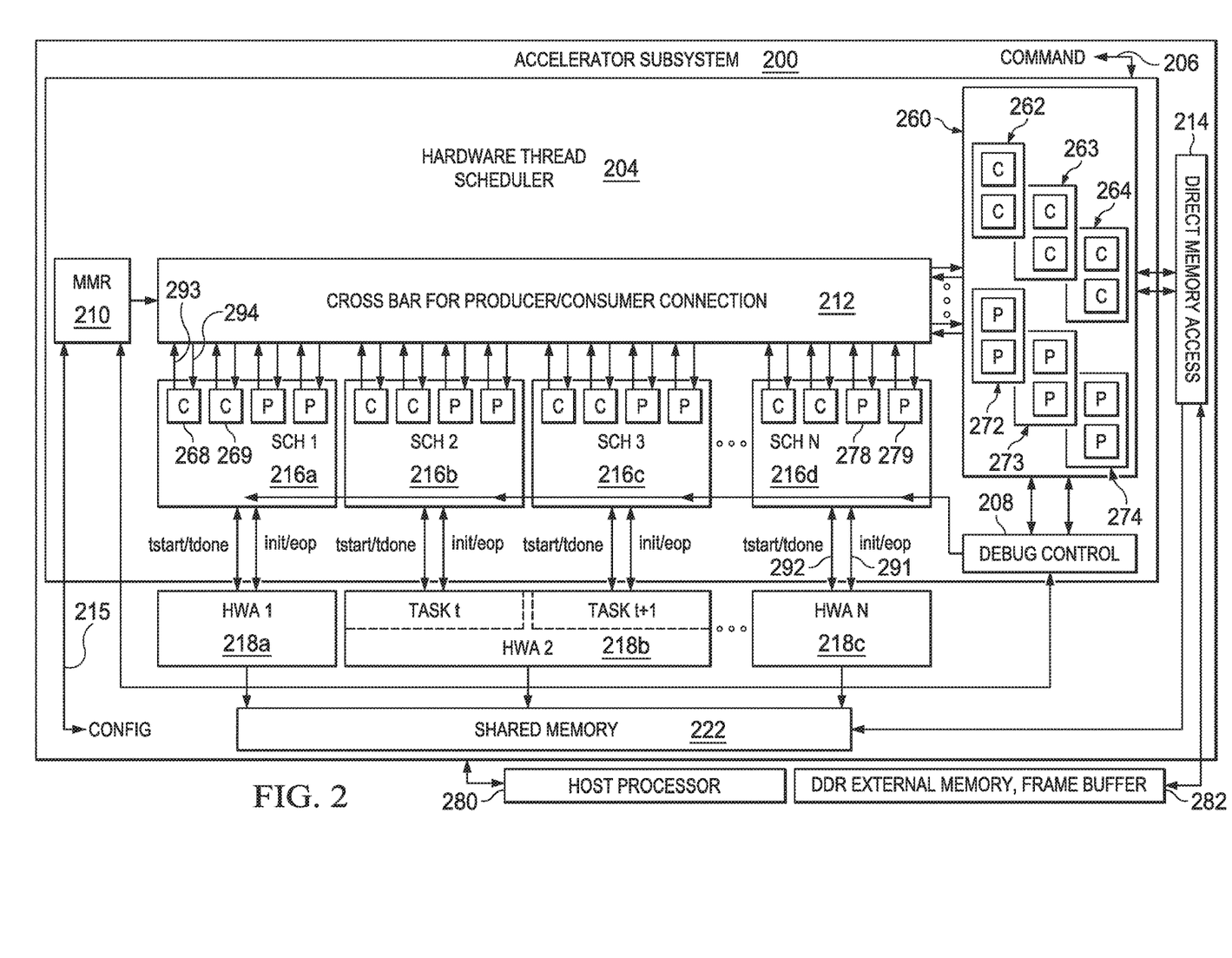
FIG. 2 is another block diagram depicting an example debugging system that includes a debug control implemented within an accelerator subsystem.

FIG. 2 is a block diagram of an example accelerator subsystem 200 that includes multiple hardware accelerators 218 and a hardware accelerator thread scheduler (HTS) 204. While three hardware accelerators 218*a*, 218*b*, and 218*c* are illustrated in this example, in other examples include fewer or more than three hardware accelerator modules.

Tasks are executed by each of a plurality of hardware accelerators 218*a-c*. Each of the hardware accelerators 218*a-c* is a processing block (e.g., corresponding to the processing blocks 110*a*-110*n* discussed with respect to FIG. 1). The hardware accelerators 218*a*-218*c* can be configured to implement a number of processing modules. Examples of processing modules include an image processing engine for streaming line based data, a lens distortion correction engine for block based data, a noise filter for line based data, a multi-scalar engine for line based data, a stereo disparity engine for block based data, or a dense optical flow engine for multiples of line based data.

For example, line and block based data may be stored in a memory, such as direct memory access (DMA) memory and associated shared memory. Streaming the block based data involves reading or writing a whole block at a time. Block based data is two dimensional data which can be described by a width and height parameter. For example, widthwise, block based data is a sequence of bytes or bits and lengthwise, block based data is a collection of data records, each having a sequence of bytes or bits. In contrast, line based data would correspond to a single record of data in one dimension with a sequence of bytes or bits. Streaming line based data involves reading or writing one record of one dimensional data at a time.

The HTS 204 also includes a debug control 208. The debug control provides an ability to debug a pipeline that is executed either as a processing accelerator task, consumer DMA task or a producer DMA task. As a further example, MMR 210 can be accessible during a debug session via a configuration interface 215 to set operating parameters for the HTS 204. For example, the configuration interface 215 can be used to program debug control parameters, which are stored (e.g., written into registers) in the MMR 210. The MMR 210 can also store data that specifies the state of a particular task or task schedule. The MMR 210 is further configured to indicate a current state of a pipeline, and to indicate a configuration of the plurality of consumer and producer sockets within each of the task schedulers 216*a-d*. Consumer/producer dependencies are associated with the consumer sockets and the producer sockets. Logic in the HTS (e.g., in debug control, task schedulers 216*a-d* and/or CDMA schedulers 262-264 and PDMA schedulers 272-274) can utilize the debug control parameters to determine the state of a particular pipeline as well as whether it is enabled or disabled for executing debug functions.

Each of the hardware accelerators 218*a-c* may have access to shared memory 222 in which various blocks of storage area may be designated for storage of data that are being processed by the hardware and/or software processing modules.

In some examples, shared memory 222 is implemented as "level 2" (L2) memory and may be implemented within a single integrated circuit that includes the various hardware accelerator modules 218 and HTS 204 as a "system on a chip" SoC. Thus, the accelerator subsystem 200 may be implemented as part of an SoC. A larger external memory 282 may be coupled to accelerator subsystem 200 to provide storage room for one or more frames of image data, etc. External memory 282 may be implemented as double data rate (DDR) synchronous dynamic random-access memory (SDRAM), for example. Various other types of bulk memory may be used in place of DDR memory in various examples, such as DDR3, DDR4, etc. External memory 282 may also be implemented using on chip RAM (part of accelerator subsystem 200) which is referred as "level 3" (L3) memory or DDR memory.

HTS 204 is coupled to a direct memory access (DMA) module 214. DMA 214 is configured to respond to data transfer requests by HTS 204. DMA 214 copies data into shared memory 222 to facilitate processing of threads in respective pipelines within accelerator subsystem 200. DMA 214 and DMA schedulers 260 may be programmed to move blocks of data between L2 memory 222 and external memory 282 using DMA operations.

HTS 204 may include a set of task schedulers 216*a-d*, one or more associated with each of the hardware accelerators 218*a-c*. HTS 204 may also include a set of producer DMA schedulers such as 272-274 to schedule loading blocks of data from external memory 282 into shared memory 222. HTS 204 may also include set of consumer DMA schedulers such as 262-264 to schedule storing blocks of data from shared memory 222 into external memory 282. The HTS module 204 is a messaging layer for low-overhead synchronization of the parallel computing tasks and DMA transfers and may be configured by a host processor 280. As an example, host processor 280 is located within the accelerator subsystem 200. In another example host processor 280 may be located in a separate IC. Memory mapped register (MMR) 210 may be initialized with various control parameters by host processor 280 to control the operation of HTS 204.

HTS 204 allows autonomous frame level processing for the accelerator subsystem 200. HTS 204 defines various aspects of synchronization and data sharing between accelerators 218a-c. By looking at the producer and consumer dependencies, HTS 204 may ensure that a task starts only when input data and adequate space to write out data is available. In addition to this, HTS 204 may also take care of pipe-up, debug, and abort for HWAs 218a-c. HTS 204 may also help in controlling power consumption by generating active clock windows for hardware accelerator clocks when no task is scheduled, for example.

Each task scheduler 216a-d may be coupled to a respective HWA 301-303 and communicate via interface signaling to perform various functions, such as: an "end of pipeline" and "init" signals 291, a "task start" and "task done" signals 292, etc. An example set of interface signals for interfacing between HTS 204 and HWAs 218a-c is set forth in Table 1. The signals represented in Table 1 are an example for the example of FIG. 2; in another example, the operation of the interface signals may be configured to operate in a different manner than illustrated in Table 1.

TABLE 1

HTS interface with HWA

| Signal name | Description |
| --- | --- |
| Init | On init pulse, each accelerator reinitializes internal state/count/interface. |
| init_done | Acknowledgement of init activity. Ensure init_done is not looped back (minimum single cycle gap) |
| Tstart | Task start |
| Tdone | Task done, acknowledgement of completion of data processing for single task |
| tdone_mask | For each Tdone, mask indicates validity mask band of output data. When '0' indicates [n-1:0] corresponding output buffer is not generated for this Tdone. When '1' indicates valid output buffer is generated. Corresponding producer socket count is incremented. |
| Eop | Each HWA indicates completion of frame with cop along with Tdone. HWA will receive init sequence before starting next Tstart |

There are multiple DMA channel schedulers to control DMA channels, demonstrated as including producer DMA (PDMA) schedulers 272-274 and consumer DMA (CDMA) schedulers 262-264. The PDMA and CDMA schedulers are connected to DMA channels and configured to schedule data transfer for respective DMA channels. For example, the PDMA and CDMA schedulers can utilize signal interfaces to trigger data transfer, such as to indicate the start and completion of respective tasks. Each scheduler module 216a-d and 272-274 further may be configured to generate other interface signals to indicate other actions and status, such as indicated at 294. Similarly, each scheduler module 216a-d and 262-264 may be configured to receive one or more interface signals via its consumer sockets, such as indicated at 294. For each consumer socket, it may be configured to generate decrement "dec" signals from its connected consumer, such as indicated at 293. Interface signals from all of the schedulers may be communicated to a crossbar switch 212, which may be controlled by MMR 210. Each task scheduler 216a-d may include one or more consumer sockets 268-269 and/or one or more producer sockets 278-279. Pending "pend" signals (generated by producers) indicate the availability of consumable data, and dec signals (generated by consumers) indicate the consumption and completion of produced data. A channelized DMA can be referred to as a node.

As one example, debug control 208 accesses the debug control parameters stored in MMR 210 (e.g., via lookup) to determine which pipelines are active and enabled, and uses the MMR data to control application of debug commands to the task schedulers 216a-d and/or CDMA schedulers 262-264 and PDMA schedulers 272-274. In other examples, such logic may reside in the task schedulers 216a-d, CDMA schedulers 262-264 and/or the PDMA schedulers 272-274 to control which one or more schedulers and CDMA schedulers 262-264 and PDMA schedulers 272-274 execute debug functions in response to command instructions sent (e.g., broadcast) from the debug control. There is two way communication between the schedulers (task schedulers 216a-d and/or CDMA schedulers 262-264 and PDMA schedulers 272-274) and debug control 208. For example, the schedulers may acknowledge receipt of a debug command back to the debug control 208.

By way of example, the HTS 204 is configured to receive a debug command via command interface 206. The type of the debug command may be halt, step, or resume. A halt debug command received via command interface 206 initiates a debug session. Command interface 206 can be a hardware interface or a software interface. In response to the command received via the command interface 206, the debug control 208 broadcasts a corresponding debug command to the particular task schedulers 216a-d and CDMA schedulers 262-264 and PDMA schedulers 272-274. In response to the debug command from the debug control, the schedulers and task schedulers 216a-d implement controls to execute the command e.g., to halt, step, or resume a particular thread executing within respective hardware accelerators 218a-c. In some examples, each of the schedulers and task schedulers 216a-d selectively execute (e.g., according to debug control logic) the debug command received via command interface 206 depending on the debug control parameters and the state information stored in the MMR 210. In this way, the debug commands may be applied selectively for performing debug operations with respect to one or more active pipelines that are enabled to perform such debug operations while other pipelines continue to execute their respective tasks. After a debug command is executed, the HTS 204 may send a completion acknowledgement back through to command interface 206.

In one example, the plurality of task schedulers 216a-d are configured to halt a currently active pipeline/thread in response to a halt command issued by the debug control 208. While the debug control 208 implements control of the task schedulers 216a-d in response to the command, operations of the DMA 214 are continued without impacting load/store of input/output data for a chosen pipeline (thread). Each halted pipeline is configured to send an acknowledgement of a halted state to debug control 208. Debug control 208 thus waits for a halt acknowledgement from each pipeline component that is configured to be halted. In response to receiving each acknowledgement, the debug control 208 returns a subsystem level halt acknowledgement to command interface 206 (or to another interface signal) to indicate the halted state for the designated pipelines. When the pipelines are halted, debug operations may be performed to investigate values of inputs, outputs and registers containing state and other information. For example, the contents of MMR 210 can be investigated via configuration interface 215. A similar process happens for step and resume commands.

In some examples, debug control 208 broadcasts a halt request to functionally active and halt-enabled pipelines. In other examples, debug control 208 broadcasts the halt request to pipelines whether they are active or not and/or whether they are halt-enabled or not. The system further may include logic (which may be pipeline components, for example, the task schedulers 216a-d or separate logic) configured to determine and control which pipeline execute the halt request that is issued by the debug control. For example, the logic can utilize a pipeline debug control register stored in memory (e.g., via look-up) to ascertain the status of each pipeline as active or inactive as well as whether such pipeline is enabled or disabled to execute the halt request. Similar logic is applied for step and resume requests issued by the debug control.

As a further example, assume that operations are processing within a number of pipelines. A halt command may be received by command interface 206. Debug control 208 receives the halt command. In response to debug control 208 receiving the halt command, debug control 208 broadcasts a halt request to each of task schedulers 216a-d, CDMA schedulers 262-264 and PDMA schedulers 272-274. In some examples, the debug control 208 may selectively broadcast the command to those pipelines that are active and halt-enabled, including to task schedulers 216a-d, the producer direct memory access schedulers (PDMA) 272-274 as well as the consumer direct memory access schedulers (CDMA) 262-264. In other examples, the debug control 208 can broadcast the command globally to all pipelines, and associated debug logic (e.g., in or otherwise associated with task schedulers 216a-d and CDMA schedulers 262-264 and PDMA schedulers 272-274) can determine whether each pipeline is active and halt-enabled to thereby control whether or not the debug request (e.g., halt, resume, step) will be executed for each pipeline. For example, the associated debug logic can utilize data stored in the MMR specifying whether or not each pipeline is active and halt-enabled. The schedulers and schedulers for each pipeline, which are both active and halt-enabled, can respond to the broadcast with an acknowledgement message indicating it has received and executed the halt request. In response to the halt request, the active and halt-enabled pipelines stop execution of the current task at a nearest boundary.

In an example, if there are 5 active pipelines (0, 1, 2, 3, and 4) and pipeline 0 is to be investigated, then pipelines 1, 2, 3, and 4 are set to halt-disabled. Because pipeline 0 is active and halt-enabled, pipeline 0 performs the halt and continues execution of the current task to terminate at the nearest boundary; however, pipelines 1, 2, 3, and 4 do not implement the halt but instead each pipeline will continue normal execution of tasks while pipeline 0 is halted or performs other debug operations. The halt request may be considered a secondary command because default processing of the pipeline is the primary command. In this example, debug control 208 has issued the halt request to pipeline 0, and thus, at least one of the plurality of task schedulers 216a-d is configured to stop a currently active pipeline 0 at a nearest task boundary in response to the halt request from debug control.

During a debug session when one or more pipelines have been halted, as described above, the debugger (e.g., external hardware and/or software) can read available resources (e.g., MMR and/or DMA memory) to ascertain a state of operation, intermediate data output to compare against what is supposed to have been generated, and/or look for a mismatch in intermediate data output to determine at a line by line level or block by block level where a failure has occurred. During debug, a step command can be received and executed by debug control to cause one or more currently halted pipelines (e.g., associated schedulers/schedulers and other components within the respective pipeline) to execute a next one task, and then revert back to a halted state by advancing to the next nearest boundary following completion of such task. The debug can broadcast the step request in the same manner as described for the halt command. For example, in response to the step command, the associated debug logic can access the configuration and status data in the MMR 210 to determine which pipelines are currently halted and have the capability to resume execution for one task. The components of the pipeline, which cannot execute one task based on the current status of input and output dependencies, will remain in a halted state. The associated debug logic is configured to determine whether a component can resume for just one task or not can be implemented anywhere in the system, including the components of the pipeline themselves, debug control 208, or anywhere else in accelerator subsystem 200. After debug is completed, a resume command can be sent through command interface 206 and used to reactivate currently halted pipelines by debug control 208 sending a corresponding resume request signal, in response to which halted pipelines can resume normal operations and execute scheduled tasks accordingly.

Figure 3:
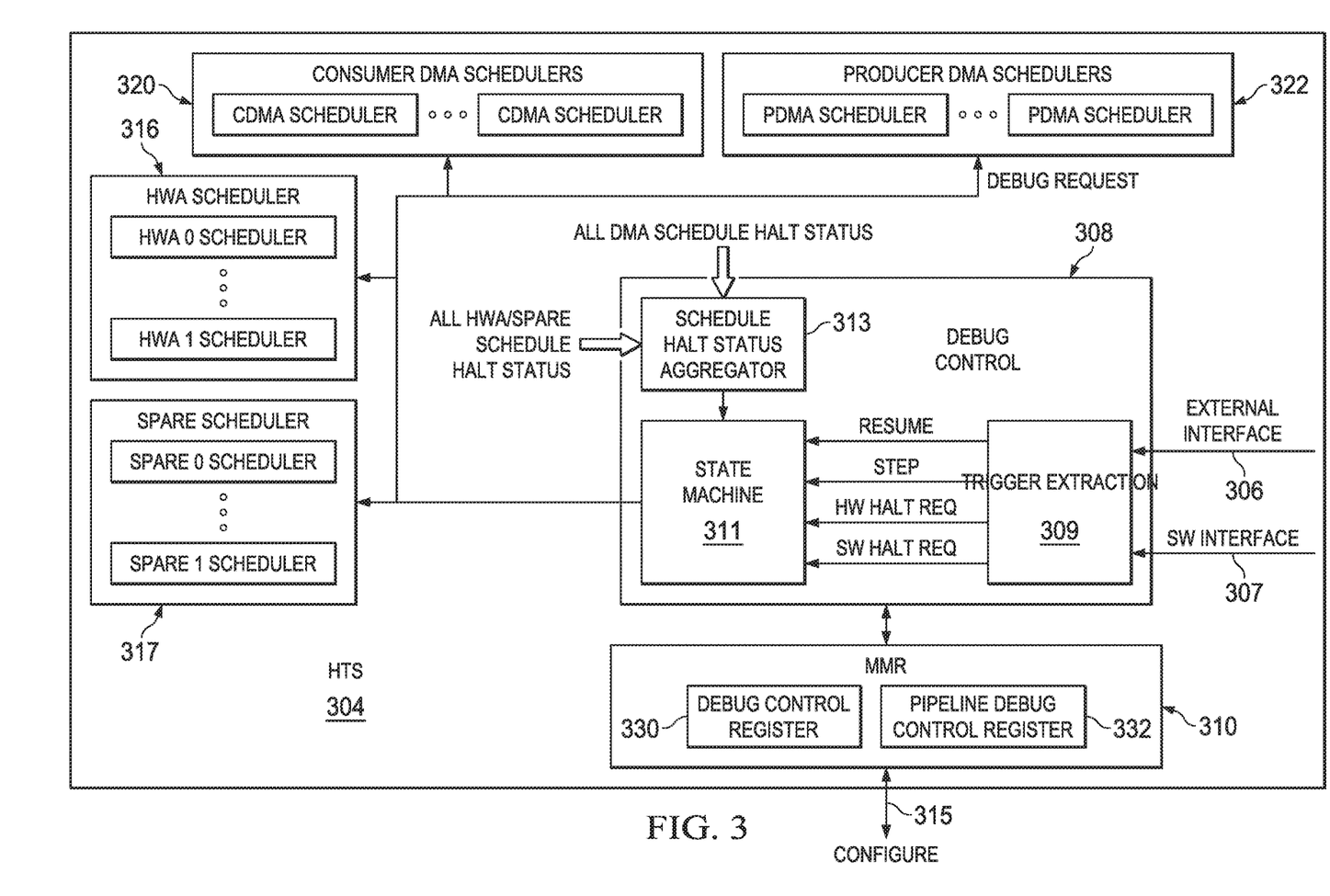
FIG. 3 is a block diagram showing an example internal configuration of a debug control.

FIG. 3 is a block diagram of a hardware thread scheduler (HTS) 304, showing an example configuration of a debug control 308. In the example shown in FIG. 3, the debug control 308 is embedded within HTS 304. In other examples, debug control 308 can be external to the HTS 304 or the hardware accelerator subsystem. As mentioned, the debug control 308 is configured to receive a debug command via one or more interfaces, such as including an external interface 306 and/or a software interface 307.

A trigger extraction module 309 identifies the type of command, such as being either resume, step, or halt (each type of command being received either from an external hardware interface or a software interface). Debug control 308 includes a state machine 311 (e.g., a finite state machine) configured to control debug actions for task schedulers, demonstrated in this example as including a HWA scheduler 316, a spare scheduler 317, consumer DMA schedulers 320 and producer DMA schedulers 322. For example, the state machine 311 is configured to instruct respective schedulers for advancing each selected active pipeline to a stable state in response to a debug halt command. The schedulers 316, 317, 320 and 322 determine and set the task schedules for a number of processing blocks (e.g., processing blocks 110a-n as depicted in FIG. 1) or hardware accelerators (e.g., hardware accelerators 218a-c as depicted in FIG. 2).

As an example, the state machine 311 broadcasts a halt request to one or more of the HWA scheduler 316, spare scheduler 317, CDMA schedulers 320, and PDMA schedulers 322. For example, the halt request is a single bit asserted at an input of the receiving schedulers or a value set in a register that is read by the schedulers. Each scheduler 316, 317, 320 or 322 processes the halt request broadcast by the state machine 311. Schedulers associated with functionally active and functionally enabled pipelines respond to the halt broadcast, such as by providing an acknowledgement of the halt request on behalf of respective pipelines. The HTS 304 employs logic to determine whether a pipeline is active and enabled to be halted (e.g., halt-enabled). For example, the logic can access state and configuration data stored in MMR 310, such as may including information in debug control register 330 and/or pipeline debug control register 332. In response to the halt request from the state machine 311, the CDMA schedulers 320 associates the broadcasted halt request with an appropriate CDMA schedule for issuance of a decrement signal for a schedule associated within one of the HWA schedules scheduled by the HWA scheduler 316 (or a spare schedule scheduled by the spare scheduler 317). In response to a halt request broadcast from the state machine 311, the PDMA schedulers 322 associate the halt request broadcast with an appropriate PDMA schedule for issuance of a pending signal for a schedule associated within one of the HWA schedules scheduled by the HWA scheduler 316 (or a spare schedule scheduled by the spare scheduler 317).

In some examples, debug control 308 includes logic to selectively broadcast a halt request to functionally active and halt-enabled pipelines. In other examples, debug control 308 broadcasts the halt request globally to the schedulers of pipelines whether they are active or not, and/or whether they are halt-enabled or not and a separate logic determines which pipelines halt. Similar logic is applied for step and resume.

By way of further example, the debug control 308 has access to debug control register 330 and pipeline debug control register 332 stored in MMR 310. For example, the debug control register 330 is programmed with data to control and implement basic debug functions and specify status of debug operations. Also, certain register values of the debug control register 330 indicate the current state of debug activity, including an indication of what debug command is being executed (e.g., halt, step or resume commands). As an example, the step command can be implemented by configuring a single step enable field of the debug control register 330. The step command then executes/resumes one task within a thread/pipeline. After completing the single task, the associated scheduler returns the thread/pipeline back to the halt condition. If part of the pipeline cannot execute just one task, that part of the pipeline does not step/resume but remains in a halted state. Execution of other tasks may remain halted or continue executing depending on how the halt and step commands are being applied across the respective pipelines.

The pipeline debug control register 332 is configured (e.g., in response to configuration command data via configuration interface 315) to store pipeline data to control pipeline debug operations. For example, the pipeline data in pipeline debug control register 332 is configured to specify which pipelines are disabled (or enabled) to not respond (or respond) to a debug command (e.g., halt, step and resume commands). Thus, associated logic used by the debug control can selectively apply debug commands to certain pipelines schedules based on the data stored in pipeline debug control register 332. For example, register values are set to a predetermined value (e.g., to 1 or 0) to control whether or not a particular pipeline is to respond to debug events.

By way of example, the bits of the debug control register 330 or the pipeline debug control register 332 can be written, read or modified via the configuration interface 315. For instance, debug control 308 can use its own host or a system host (or another mechanism) to write the bits of debug control register 330 and pipeline debug control register 332 via configuration interface 315. Debug control 308 can employ control logic or another mechanism to read and write bits of debug control register 330 and pipeline debug control register 332. Debug control 308 thus can perform debug operations and apply debug request instructions to pipelines, selectively, based on the entries in debug control register 330 and pipeline debug control register 332.

Debug control register 330 includes various parameters that control and implement basic debug functions and specify status of debug operations. These parameters include those that enable and disable halting of selected threads, parameters that enable halting after execution of a single task, and parameters that either cause a thread to halt at a nearest boundary or return the system to a natural execution state. Reading certain parameters from debug control register 330 provide an indication that a thread is in a halted state or is in a natural execution state. Parameters of the pipeline debug control register 332 indicate which pipelines are halt-enabled or halt-disabled. Halt-enabled pipelines respond to debug requests, while halt-disabled pipelines do not respond to debug requests. Thus, the configuration interface 115 or debug control 308 may write certain bits of the pipeline debug control register in order to enable or disable certain pipelines.

As a further example, in response to the halt request from the state machine 311, the scheduler for each active and halt-enabled pipeline sends and acknowledgement to the debug control. Then, respective tasks within active and halt-enabled pipeline are halted. For example, a task executing within a processing block associated with HWA scheduler 316 (e.g., for the active and halt-enabled pipeline) advances to its nearest stable state. The schedulers for other active and halt-enabled pipelines may respond similarly to the halt request. After executing the halt by advancing to its next stable state, each halted pipelines sends a status message indicating its halted state to debug control 308. In response, debug control 308 can return a halt confirmation via one or both interfaces 306, 307 to the initiator of the debug command.

For example, the debug control 308 also includes a halt status aggregator 313 configured to receive and process halt status messages from schedulers 316, 317, 320 and 322. The halt status aggregator 313 can receive notifications (e.g., halt acknowledgements) from the CDMA schedulers 320 and the PDMA schedulers 322 (with the halt status for the DMA schedulers) as well as from the HWA scheduler 316 and spare scheduler 317 (with a halt status). In response to debug control 308 receiving halt acknowledgements, debug control 308 returns a subsystem level halt acknowledgement via external interface 306 and/or software interface 307 (and/or via configuration interface 315) to indicate that the pipelines have halted and are ready for debug investigation.

The debug control 308 is configured to perform similar processes for step and resume commands. For example, the debug control 308 broadcasts each step or resume command to the HWA scheduler 316, spare scheduler 317, CDMA schedulers 320 and PDMA schedulers 322. Corresponding logic controls application of the commands for each scheduler, such as based on configuration and state information stored in debug control register 330 and pipeline debug control register 332 of MMR 310 as disclosed herein.

Figure 4:
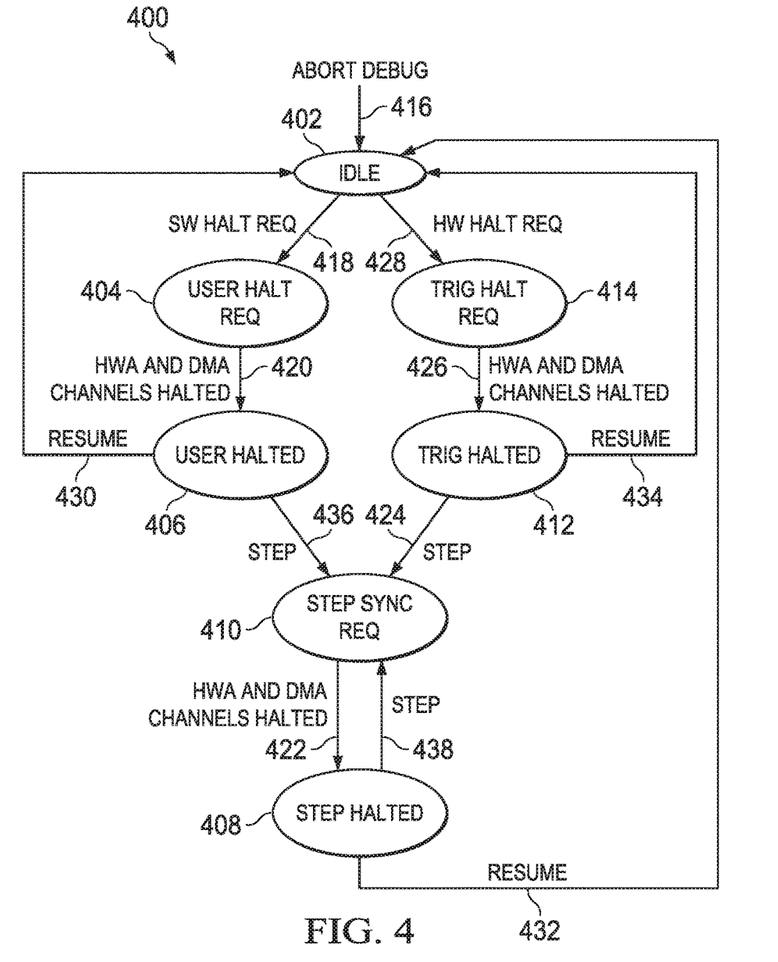
FIG. 4 is an example state machine implemented by a debug control for a data processing hardware accelerator.

FIG. 4 is an example state machine (e.g., state machine 311 of FIG. 3) 400 that may be implemented by a debug control (for example, debug control 108 of FIG. 1, debug control 208 of FIG. 2, or debug control 308 of FIG. 3) of a data processing hardware accelerator. The state machine 400 can transition among a series of defined states depending on a current state and a particular set of inputs. However, one state is held at a time. The debug control is configured to advance each processing pipeline to a nearest stable state, such as to enable a debug operation to occur according to state specified by the state machine 400. As disclosed herein, the debug control can advance one or more processing pipelines independently to a respective stable state. The state machine allows the debug control to track execution of debug commands received via hardware and/or software interfaces (e.g., 306 or 307).

In the example shown in FIG. 4, the states of the debug control include idle 402, user halt request 404, user halted 406, step halted 408, step sync request 410, trigger halted 412, and trigger halt request 414. For example, a breakpoint is one type of halt request. In response to encountering a breakpoint for a given task or pipeline, the debug process can halt execution of the given task or pipeline to enable investigation and other debug operations thereof. For example, an investigation or debug operation may include analyzing register values, stack data, memory locations or source code. The machine can enter a particular state depending on a transition input.

By way of example, an abort debug input 416 would cause a transition from any debug state to idle 402 (e.g., to terminate debug). A software halt request transition 418 (e.g., received via software interface 307) causes the machine to transition from idle 402 state to user halt request 404. While in the user halt request 404 state, debug control issues (e.g., broadcasts) a user halt request to schedulers associated with one or more pipelines. In response to an indication that HWA and DMA channels are halted 420 (e.g., by aggregating halt notifications from respective schedulers), the state machine transitions from the user halt request 404 state to the user halted 406 state, indicating that each active and halt-enabled pipeline has halted at a stable state. From the user halted state 406, a step command 436 causes the state machine 400 to transition from the user halted state 406 to the step sync request 410 state. In the step sync request 410 state, the debug control issues a step sync to one or more schedulers to execute one task (e.g., a next scheduled task) and then advance to the nearest (or toward the nearest) halted state following execution of such task. In response to receiving an indication that the HWA and/or DMA channels have halted (e.g., via a halted message from respective schedulers), the state machine enters the step halted state 408. Additionally, a step request at 438 (if applied during the step halted state) causes the state machine to transition from the step halted 408 state back to the step sync request 410 state to execute another task in one or more pipelines accordingly. From either the user halted 406 state or the step halted 408 state, in response to a resume command, as demonstrated at 430, 432, the state machine transitions back to the idle 402 state and each of the schedulers likewise resume normal operation.

From the idle 402 state, a hardware halt command 428 (e.g., received via hardware interface) causes the state machine to transition from idle 402 state to the trigger halt request 414 state. In the trigger halt request 414 state, the debug control issues a trigger halt request to one or more schedulers associated with respective pipelines for which the debug operation is to be performed. As disclosed herein, control logic can selectively apply the debug requests (e.g., halt, step and resume requests) issued by debug control, such that active and halt-enabled schedulers implement debug while other schedulers may continue normal operation. In response to determining that the HWA and/or DMA channels have halted (e.g., based on aggregating notifications from respective schedulers executing the halt request), the state machine transitions from the trigger halt request 414 state to a trigger halted 412 state. From the trigger halted state, the state machine may either transition to the step sync request 410 state where a step request is issued to the schedulers. In response to determining that the specified HWA and/or DMA channels have halted (e.g., based on receiving halted notifications from respective schedulers), the state machine 400 transitions from the step sync request 410 state and enters the step halted 408 state, as mentioned above. From the trigger halted 412 state, a resume command at 434 causes the state machine to transition from a trigger halted 412 state to the idle 402 state, at which the schedulers are instructed to resume normal operation.

Figure 5:
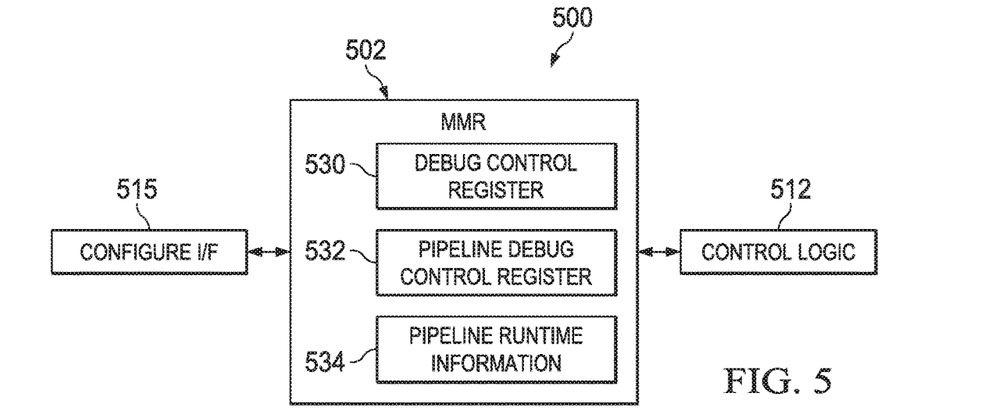
FIG. 5 is a block diagram of an example configuration of a memory mapped register.

FIG. 5 is a block diagram of an example configuration 500 of a memory mapped register (MMR). MMR 502 includes debug control register 530, pipeline debug control register 532, and pipeline runtime information 534. Various types of data structures can be implemented to include the information included within debug control register 530, pipeline debug control register 532, and pipeline runtime information 534 (e.g., registers, tables, etc.). Control logic 512 can access data stored in the MMR 502, including each of the debug control register 530 and pipeline debug control register 532 to control application of debug commands issued by debug control.

Debug control register 530 includes debug control and status data that defines what mode state of debug is executing (if any). Data in debug control register 530 can be set by debug control (e.g., debug control 108, 208, or 308) in response to debug commands received via software and/or hardware interfaces. Debug control register 530 may also store state information implemented by the debug control state machine, which the debug control may use to control implement debug functions, such as to halt a particular pipeline at a next possible halt boundary, to enable single step execution, and/or to resume a pipeline to a natural execution state.

Pipeline debug control register 532 includes data to define how each pipeline will respond to debug requests issued by debug control. For example, the debug control register includes an entry for each pipeline and to specify whether or not each pipeline is halt-enabled such that its associated scheduler may execute a halt or other debug request issued by debug control. Pipeline debug control register 532 also includes whether or not each pipeline is active or inactive. For example, pipeline halt-enablement information in the pipeline debug control register 532 may be set via configuration interface 515. If control logic 512 determines that a given pipeline is active and halt-enabled, as indicated by pipeline debug control register 532 and debug control register 530, then the given pipeline is eligible to be halted in response to the halt command.

MMR 502 also includes pipeline runtime information 534. The pipeline runtime information for example includes information about the state of the schedulers (including for example, of FIG. 2, task schedulers 216a-d, CDMA schedulers 262-264 and PDMA schedulers 272-274; and of FIG. 3, HWA scheduler 316, spare scheduler 317, CDMA schedulers 320 and PDMA schedulers 322). In some examples, the pipeline runtime information includes statistics such as a count of data buffers that are processed by the schedulers. The debug control (e.g., debug control 108 of FIG. 1, debug control 208 of FIG. 2, and/or debug control 308 of FIG. 3) accesses the pipeline runtime information 534 to determine whether there is any conflict among the schedulers or any failure within the accelerator subsystem (e.g., accelerator subsystem 100 or accelerator subsystem 200). The pipeline runtime information 534 is updated either through configuration interface 515 or by control logic 512.

Control logic 512 can access the MMR to access the debug control register 530, pipeline debug control register 532, and pipeline runtime information 534. For example, control logic 512 can implement and control application of debug requests based on data stored in the debug control register 530, pipeline debug control register 532, and pipeline runtime information 534. Control logic 512 may respond to a debug command received via a command interface (e.g., command interface 206, external interface 306, and/or software interface 307). As one example, control logic 512 resides in a debug control (e.g., debug control 108, debug control 208, or debug control 308). In other examples, the control logic 512 resides in each of a plurality of task schedulers (e.g., task schedulers 216a-d), or it may be distributed across debug control and a plurality of task schedulers.

Configuration interface 515 may be connected to the MMR 502 such as for writing or modifying data stored in the debug control register 530, pipeline debug control register 532, and pipeline runtime information 534. In some examples, configuration interface 515 can be used to write contents of MMR 502 during a debug session. Thus, the debug operations and selective application of debug commands by debug control (e.g., debug control 108, debug control 208, or debug control 308) may be configured via the configuration interface 515. Additionally, during debug operations, such as while active and debug-enabled pipelines (including associated schedulers) are halted, contents of MMR 502 can be investigated by a debugger (e.g., a user) via the configuration interface 515 or another interface. If part of the system has failed, for example, a debugger (e.g., a user) may investigate the contents of MMR 502 via configuration interface 515.

Figure 6:
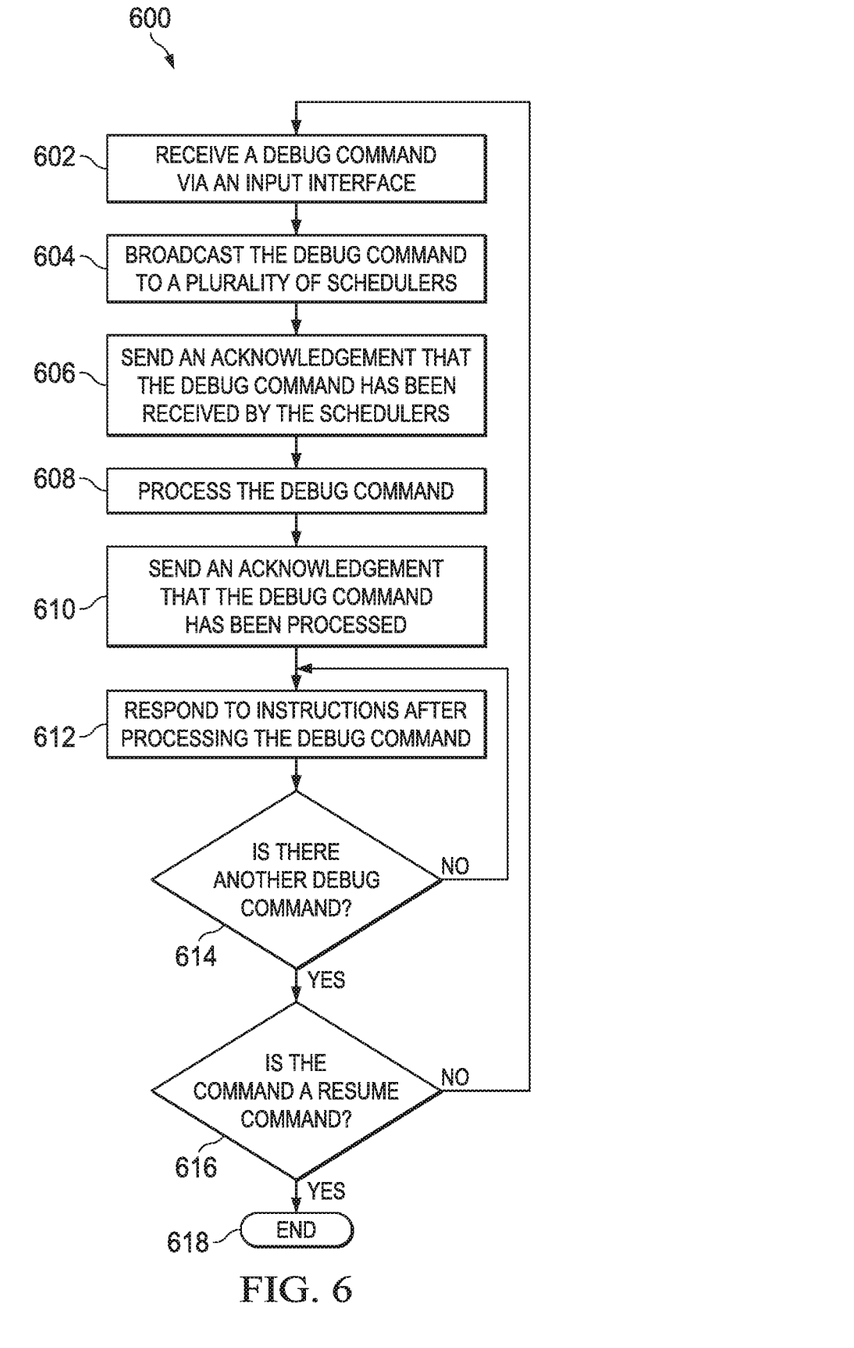
FIG. 6 is a flowchart of an example method to implement debugging for a data processing hardware accelerator.

FIG. 6 is a flowchart of an example method 600 to implement debugging for a data processing hardware accelerator (e.g., accelerator subsystem 100 or accelerator subsystem 200). At 602, an input interface (e.g., command interface 106, command interface 206, or external interface 306 or software interface 307) receives a debug command. The command can be received from an external hardware interface (e.g., external interface 306) or from a software interface (e.g., software interface 307 that writes the command to corresponding register). The command is forwarded to a debug control (e.g., debug control 108, 208, and/or 308), which processes the command according to a state machine (e.g., 311, 400). For example, the type of the debug command can be a hardware halt, a software halt, a resume, or step. The state machine (e.g., 311, 400) (e.g., a finite state machine) includes a plurality of states that the debug control (e.g., 108, 208, 308) can transition through as part of executing a debug operation with respect to a plurality of processing pipelines.

At 604, the debug request is broadcast by the debug control to a plurality of schedulers (including for example, of FIG. 2, task schedulers 216a-d, CDMA schedulers 262-264 and PDMA schedulers 272-274; and of FIG. 3, HWA scheduler 316, spare scheduler 317, CDMA schedulers 320 and PDMA schedulers 322). At 606, the schedulers send an acknowledgement to the debug control that the request has been received.

At 608, the schedulers (e.g., the active and enabled schedulers) process the debug request. For example, in response to the debug request and based on control logic, the schedulers will instruct various processing blocks to halt, step or resume depending on the debug request. Active and enabled pipelines will respond to the request, while pipelines that are either inactive or disabled will not respond to the debug request. For example, the control logic applies the debug request to schedulers based on information contained within an MMR of the HTS (e.g., MMR 210 or MMR 310). The schedulers advance respective active and enabled pipelines to the next stable state during processing at 608. After processing the debug request and advancing to the next stable state, at 610, the schedulers send an acknowledgement to the debug control indicating completion of the debug request.

At 614, it is determined whether there is another debug command. If there is not another debug command, then the processing blocks continue operation in which halt enabled pipelines remain halted during debug until debug control issues another debug request and non-enabled pipelines continue normal operation. In response to another debug command at 614, the method proceeds to 616. At 616, it is determined whether the command is a resume command. If the command is a resume command, the debug control process ends at 618. If the process is not a resume command, the process returns to 602 to process the next command.

The method shown in FIG. 6 can further include storing schedule data by a debug control register (e.g., 330) or by a pipeline debug control register (e.g., 332) to specify which schedules are to respond and not respond to a halt command, such that the halt command is selectively applied to certain schedules. Also, the debug control (e.g., 108, 208, 308) is configured to control the plurality of task schedulers (e.g., 216a-d) based on the debug requests, such as to halt at a line of data and a block of data, advance pipeline control to a stable state, pause pipeline processing, and facilitate debugging of a multi-threaded processor, as disclosed herein. Active tasks within the pipeline are executed by a plurality of hardware accelerators (e.g., 110a-n, 218a-c) that are each coupled to a respective one of the plurality of task schedulers (e.g., 216a-d) and to a shared memory (e.g., 122). Further, the debug control (e.g., 108, 208, 308) is configured to selectively halt an individual hardware accelerator (e.g., any of 110a-n, any of 218a-c), and to step through execution of tasks at an individual hardware accelerator (e.g., any of 110a-n, any of 218a-c), while continuing operations of a direct memory access module (e.g., 214).

An integrated circuit chip can implement the method 600 depicted in FIG. 6, such that the debug control (e.g., 108, 208, 308) enables debugging of one or more pipelines implemented by hardware accelerators (e.g., 110, 218, 318). The method 600 can further includes performing a debug investigation to investigate an issue after issuing the debug command (e.g., 106, 206).

The debugging solution described herein allows image processing software and hardware architectures to be debugged at line level granularity. Image processing operates at a line level to stream data. However, due to the integration of image processing solutions within a shared memory architecture, where the HTS task/thread manager manages line level execution, debug control controls the stopping of video imaging subsystem (VISS) (streaming image processing) at line level and allows debugging for any failure. Further, since all resources of VISS are exposed for observation, the debugging solution described herein makes it feasible to detect any fault. However, in some cases, it may not always be possible to get a correct output after resuming pipeline processing to completion.

As a further example, when VISS operates in a real time streaming mode, a specified scheme is extended to freeze the pipeline at a specific point in execution and protect it from any interference for debug investigation. The debugging solution described herein provides a snapshot of VISS states and read only memory (RAM), etc., which further operates to isolate VISS from other activity, provides for debugging and discarding the frame. The same debugging scheme is extendible for any other real time streaming and/or non-streaming modules.

What have been described above are examples of the disclosure. It is not possible to describe every conceivable combination of components or method for purposes of describing the disclosure, but many further combinations and permutations of the disclosure are possible. Accordingly, the disclosure is intended to embrace all such alterations, modifications, and variations that fall within the scope of this application, including the appended claims.

What is claimed is:

1. A system comprising:
   a plurality of hardware schedulers, different ones of the hardware schedulers configured to schedule different ones of a plurality of pipelines for processing instructions;
   a debug control coupled to the hardware schedulers, and the debug control configured to control at least a controlled one of the hardware schedulers to halt, step, or resume a respective one of the pipelines corresponding to the controlled hardware scheduler to enable debugging of the pipeline independently of hardware schedulers other than the controlled hardware scheduler and independently of pipelines other than the respective pipeline; and
   a hardware accelerator coupled to the controlled hardware scheduler and configured to execute instructions for the respective pipeline.

2. The system of claim 1,
   further comprising a hardware thread scheduler;
   wherein the debug control and the plurality of hardware schedulers are embedded within the hardware thread scheduler.

3. The system of claim 1,
   further comprising a direct memory access module;
   wherein the hardware accelerator is a respective one of multiple hardware accelerators; and
   wherein the debug control is configured to execution by the respective hardware accelerator of the instructions for the respective pipeline, while continuing operations of the direct memory access module, in response to the debug control controlling the controlled hardware scheduler to halt the respective pipeline.

4. The system of claim 1,
   wherein the hardware accelerator is a respective one of multiple hardware accelerators;
   wherein the debug control is configured to communicate a signal to the controlled hardware scheduler to halt, step, or resume the respective pipeline; and
   wherein the debug control is configured to control execution by the respective hardware accelerator of the instructions in response to the signal.

5. The system of claim 1, wherein the debug control comprises:
   a debug control register to store schedule data that specifies which of the hardware schedulers are to respond to a halt command from the debug control;
   a pipeline debug control register configured to store pipeline data to control pipeline debug operations; and
   a state machine configured to control debug actions of the hardware schedulers.

6. The system of claim 1,
   further comprising a shared memory;
   wherein the plurality of hardware schedulers further comprise a set of producer schedulers configured to load blocks of data from an external memory into the shared memory, and a set of consumer schedulers to store blocks of data from the shared memory into the external memory.

7. The system of claim 1, wherein the debug control comprises a halt status aggregator configured to aggregate task halt status information from the plurality of hardware schedulers.

8. The system of claim 1, wherein the debug control is configured to control the controlled hardware scheduler to halt processing of one or more lines of data or multiple blocks of data.

9. The system of claim 1, wherein the hardware accelerator is one of multiple hardware accelerators that include:
   an image processing system for streaming line based data;
   a lens distortion correction engine for block based data;
   a noise filter for line based data;
   a multi-scalar engine for line based data;
   a stereo disparity engine for block based data; and
   a dense optical flow engine for multiples of line based data.

10. The system of claim 1, wherein the controlled hardware scheduler performs a sequence of actions on the respective pipeline in response to the signal, and
    wherein the debug control is configured to communicate the signal in response to a command from an external interface driven by components of a system on a chip or via a software write by a memory mapped register into a predefined control register.

11. The system of claim 1, wherein the controlled hardware scheduler is configured to halt a currently active pipeline at a nearest boundary in response to a halt command issued by the debug control.

12. The system of claim 1 implemented in an integrated circuit chip, with a multi-threaded processor that includes the hardware accelerator.

13. A method, comprising:
    receiving a debug command via an interface;
    broadcasting a debug request based on the debug command to a plurality of hardware schedulers, ones of the hardware schedulers configured to schedule processing of tasks by a corresponding one of a plurality of pipelines; and
    sending a first acknowledgment, by the plurality of hardware schedulers, to indicate that the debug command has been received;
    processing the debug request to advance at least one active pipeline to a next stable state, wherein the processing is performed by one of the hardware schedulers corresponding to the active pipeline independently of hardware schedulers other than the corresponding hardware scheduler and independently of pipelines other than the active pipeline; and
    sending a second acknowledgment, by the corresponding hardware scheduler, to indicate that the debug command has been processed.

14. The method of claim 13, further comprising storing pipeline enablement data in a debug control register to specify which of the pipelines to subject to the debug request, the enablement data indicating which of the plurality of hardware schedulers is debug-enabled.

15. The method of claim 14, wherein the debug request is a halt request, and processing the debug request includes:

sending the halt request to at least the debug-enabled schedulers operating to halt processing of a line of data or a block of data in response to the halt request.

16. The method of claim 15, further comprising:

sending a step request, by the debug control, to the plurality of hardware schedulers in response to the debug command being a step command; and processing the step request, by each of the debug-enabled schedulers, to execute a single task in the corresponding pipelines.

17. The method of claim 14, wherein the debug control register includes data that specifies at least one of the pipelines that is not enabled to respond to the debug command, such that normal execution of tasks continues during debug for the non-enabled pipeline.

18. The method of claim 13, further comprising accessing memory via a configuration interface after issuing the debug command.

19. The method of claim 13, further comprising:

receiving a debug command that is a resume command; and sending a debug request that is a resume request from the debug control to at least the debug-enabled schedulers, in response to the resume command, to resume normal operations of the debug-enabled schedulers and the corresponding pipelines.

20. A system comprising:

a plurality of hardware task schedulers, each corresponding to and configured to schedule a different respective one of a plurality of pipelines for processing instructions associated with data; and a debug control configured to control at least a controlled one of the plurality of hardware task schedulers to halt, step, or resume the respective pipeline to enable debugging of the respective pipeline independently of hardware task schedulers other than the controlled hardware task scheduler and independently of pipelines other than the respective pipeline.

* * * * *